Nov. 24, 1953  W. D. CHEESMAN  2,660,292
FLAT TOP CONVEYER CHAIN
Filed Dec. 2, 1950

WILLIAM D. CHEESMAN
INVENTOR.

BY George A. Evans
ATTORNEY

Patented Nov. 24, 1953

2,660,292

UNITED STATES PATENT OFFICE 2,660,292

FLAT TOP CONVEYER CHAIN

William D. Cheesman, Cudahy, Wis., assignor to Chain Belt Company, Milwaukee, Wis., a corporation of Wisconsin Application December 2, 1950, Serial No. 198,871

9 Claims. (Cl. 198—189)

1

This invention relates to the manufacture of conveyer chain of the type having a flat planar conveying surface and curled end portions and provides an improvement in the construction of such chain so that it will give better service. Reference may be had to U. S. Patent No. 1,966,659 to Wynne et al., illustrating the type of chain with which the invention may be practiced. The following description however is intended to be complete so that such reference is not essential to its being understood.

It is an object of the invention to improve the bearing joint between the individual links of such chain and the pins connecting them so that the pins will have greater areas of bearing contact with the barrels in which they turn.

A further object of the invention is to increase the strength of the chain so that it will not lengthen or become distorted in shape when placed under heavy loads. Accordingly, better sprocket action is maintained and the bottles or other objects which are conveyed will be transported on a truly planar surface.

The invention resides in the provision of a depressed area on the inner, bearing side of curled portions of the links which compensates for the tendency of such portions to bell or flare outwardly at the ends as a result of the forming operation. By extending this area to the region where the curled portion connects with the rest of the link, and by producing it so that the adjacent metal is in cold worked condition, the tendency of the curled portion to lift or assume non-tangent relationship with the flat, conveying portion of the link when heavy loads are imposed is effectively resisted. Furthermore, in cases where the links are not heat treated, the chain may be pre-loaded to increase its yield point without danger of harmful link distortion.

The invention is illustrated by the accompanying drawings forming a part hereof and in which.

2

Figure 4:
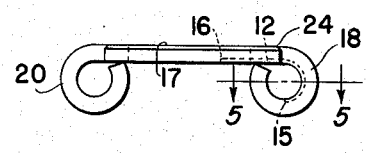
Fig. 4 is a side elevation of the link shown in Fig. 2.
Figure 6:
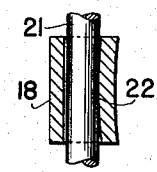
Figure 7:
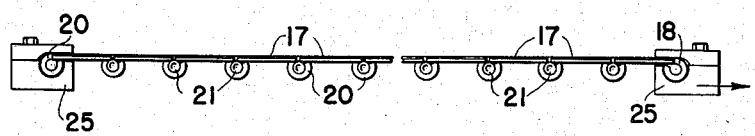

Fig. 6 is a section similar to Fig. 4 showing also in somewhat magnified manner, the condition that formerly prevailed when the knuckles were curled; and Fig. 7 is a side elevation of a plurality of connected links showing how they are pre-loaded in stretching them to final length.

Figure 1:
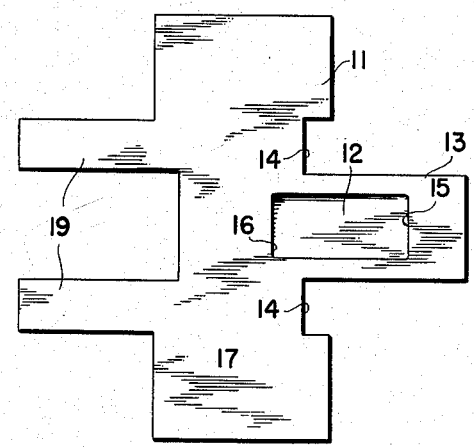
Fig. 1 is a plan view of the blank from which the link is formed, the side appearing on top being the inner side when chain is formed and connected into an endless strand.

The reference character 11 in Fig. 1 refers generally to the blank which is stamped from a flat plate of metal as the initial forming operation. This operation is usually performed as part of a successive die operation in a single press, in which stamping of the manufacturer's name and size identification, as well as blanking of the link occur as stages in this press. According to the present invention, another set of dies is employed, as part of this operation and just prior to blanking, which creates an impression 12 on one side of the link and in that portion of the tongue 13 which is later curled.

Figure 2:
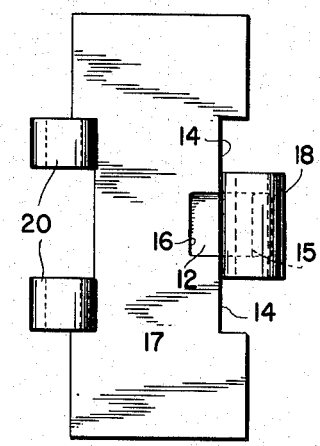
Fig. 2 is a plan view similar to Fig. 1, but with the end portions curled to produce the general link shape.

The impression 12 as illustrated herein is rectangular in shape and extends on both sides of the marginal edges 14 from which the tongue 13 extends. The forward edge 15 of the impression is located so that when the tongue 13 is curled as shown in Figs. 2 and 4, it will be at about the bottom of the curl. The inner edge 16 of the impression is located well into the flat central portion 17 of the link.

The impression is created by forcing a movable die against that side of the link which forms the inside of the link when the links are connected as an endless chain strand. Thus the impression is on the inside surface of the curl and affects the pin bearing area. The impression results in compression and cold working of the metal, thereby increasing its hardness and creating compressive stresses in the regions affected thereby. The depth of the impression for the chain will vary with the type of material used. With so-called "stainless" steel of the type which responds readily to work hardening, the depth, as illustrated, is of the order of 10% of the thickness of the plate from which the link is formed and its sides which are parallel to the tongue cover the major portion of the width of the tongue. When plain carbon steel or when stainless steel of the ferretic type is employed, the depth of the impression need only be about 3% of the plate thickness.

After coining the impression, the next operation is curling the tongue 13 to form the curl 18 as illustrated in Figs. 2 and 4. Simultaneously the tongues 19 at the other end of the link are curled to form the spaced curls 20. Care is exercised to make certain that the curls 18 and 20 are as round as possible so that the apertures or barrel portions formed on their inside will be substantially cylindrical.

Figure 3:
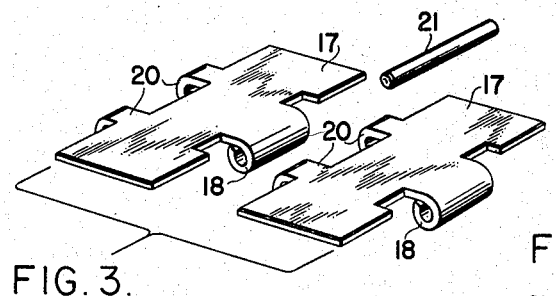
Fig. 3 is a perspective, exploded view of several links and the pin used to connect them.

Fig. 3 illustrates how two links may be aligned just prior to interfitting the intermediate curl 18 between the curls 20. When the barrels are aligned, the pin 21 is inserted and is locked in the curls 20 so that the movable joint is in the curl 18.

Figure 5:
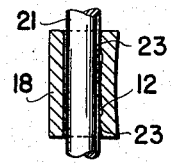
Fig. 5 is a section taken on line 5—5 of Fig. 4, the shape of parts being slightly magnified, with the connecting pin inserted for illustration of bearing contact.

Figs. 5 and 6 illustrate how the impression 12 improves the bearing between the pin 21 and the curl 18. Formerly, when the curl portion 18 was formed, the inside surface 22 was convex resulting in the pin bearing only at the center of the joint as illustrated in Fig. 6. By depressing the surface 12, the tendency of the ends of the hole to bell or flare outwardly as a result of curling are compensated for, with the result that a substantially straight bearing surface is provided as shown in Fig. 5. Actually the edges 23 on either side of the impression 12 may be slightly smaller or larger in diameter than the center of the bearing depending on manufacturing tolerances, but even if they are smaller, as illustrated, the entire surface is much straighter, and as soon as the chain wears "in" in service, ideal bearing action is obtained.

No attempt is made to work the opposite side of the curl because the pin only bears on one side when the chain is placed in tension. Hence, for this purpose the impression need only cover the contact area between the parts and may terminate at the bottom of the curl as designated by the reference character 15 in Figs. 2 and 4.

When a chain made up of links of the type herein shown is overloaded, the curled portions 18 and 20 tend to uncurl and that portion of the curl 18 designated 24 in Fig. 4 tends to rise or "kink back" on itself because of the load trying to align the center of the curls with the planar surface 17. Experience has demonstrated that the intermediate curl 18 is the one that fails first and consequently present efforts have been directed to balancing the strength of the curled sections at the two ends of the link.

It has been found that by forming the links slightly short of pitch, i. e., shorter in the distance between the centers of the curled portion than that ultimately desired, and afterwards uncurling the curled sections, and particularly the curled section 18, so that the correct pitch is then obtained, permanent compressive stresses are created on the inside surface of the curl which greatly increase the yield strength of the chain. The technique forms the subject matter of a copending application of my co-worker, Joseph J. Beck, Ser. No. 197,297, filed November 24, 1950, entitled "Sprocket Chain Construction." I have found that the links may be initially formed with the planar portions 17 tangent to the curls 18, i. e., with the section 24 aligned with the planar surface 17, and then if the area extending from the flat portion of the link into the contiguous curled portion has been cold worked as by forming the impression 12 on its underside as shown, the cold working increases the resistance of the tongue and prevents it from lifting when a load is applied. Accordingly, the technique of the aforesaid Beck application may be applied and more severe stresses imposed on the inside of the curl without deforming the planar surface of the link. Therefore the yield point of the chain is further increased.

The link illustrated in Fig. 4 is slightly short of pitch. Actually, on a 1½ inch pitch chain, the individual links are short of pitch by about .010 inch. Strands are assembled in suitable lengths, as illustrated in Fig. 7, and their ends are then pulled away from each other along the plane of the links. This is accomplished by the blocks 25 which grip the knuckles on the outer ends of the end links of the strand, one of the blocks being movable in the direction of the arrow indicated in Fig. 7. The load imposed on the movable block is in excess of the yield strength of the chain, resulting in its permanent deformation by uncurling of the eyes. The stretch in the strand of ten feet is of the order of 1½ to 2 inches when the load is applied, and ¾ of an inch to 1 inch when the load is subsequently released. This brings the individual links to the correct length, elongation being uniform throughout. The lengthening occurs by uncurling of the curled portions, which results in setting up the desired residual stresses, but it does not lift the curl above, or out of tangent relation to the central planar section on account of the conditioning of the metal by the cold working operation performed when the impression 12 is formed.

In order not to destroy the residual stresses in the curl, the links should not be heat treated, but should be left in their cold worked condition.

While the invention has been described in connection with the intermediate curled portion 18, it will be appreciated that the same procedure could be applied to the spaced curled portions 20 at the opposite ends of the link. For reasons previously mentioned however, in ordinary circumstances it is not necessary to perform such operations on the spaced tongues 19 from which the curls 20 are formed.

The invention having been described, what is claimed is:

1. The method of manufacturing chain links of the type having a curled portion at one end serving as a barrel for connection by a pin with an adjoining link, which method comprises creating a depression on the inside surface of the curled portion prior to curling and then curling said portion, the depth of the depression compensating for the tendency of the ends of the curled barrel to bell outwardly in forming and producing a substantially cylindrical surface for engagement with the connecting pin.

2. The method of manufacturing chain links of the type having a curled portion at one end serving as a barrel for connection by a pin with an adjoining link, which method comprises coining an impression on one side of the tongue which is to be curled, said impression having sides substantially parallel to the tongue and occupying the major portion of the width thereof, and then curling said tongue portion with the impression on the inner side thereof, the depth of impression compensating for the tendency of the ends of the curled barrel to bell outwardly in forming and producing a substantially straight bearing surface for the connecting pin.

3. The method of manufacturing chain links of the type having a flat central portion and a tangent curled portion at one end serving as a barrel for connection by a pin with an adjoining link, which method comprises coining a generally rectangular impression on one side of the tongue which is to be curled, said impression being parallel to the tongue and occupying the major portion of the width thereof, and then curling said tongue portion with the impression on the inner side thereof, the depth of the impression compensating for the tendency of the ends of the curled portion to bell outwardly in forming and the length of the impression being at least as great as the wearing surface of the barrel to produce a substantially straight bearing for the connecting pin.

4. The method of manufacturing chain links of the type having a flat central portion and a tangent curled portion at one end which comprises compressing the metal on the inside surface of the portion to be curled in the region where the curled portion is to commence, then curling said portion so that the pitch of the link is less than the ultimate desired, and afterwards stretching the link to final pitch, the initial step conditioning the metal whereby the curled portion may be maintained tangent to the flat portion while the stretching operation is performed, the stretching operation imposing residual compressive stresses on the inside surface of the curled portion of the link.

5. The method of manufacturing chain links of the type having a flat central portion and a tangent curled joint portion at one end which comprises cold coining an impression in the metal on one side of the link, said impression covering an area extending from the tongue portion which is to be curled into the adjacenet flat portion of the link; then curling said tongue portion so that the impression is on the inside of the curl and the pitch of the link is less than the ultimate desired; and afterwards uncurling the curled portion to increase the pitch the required amount, the coining step conditioning the metal whereby the curled portion may be maintained tangent to the flat portion while the curled portion is uncurled, the uncurling operation imposing residual compressive stresses on the inside surface of the curled portion.

6. The method of manufacturing chain links of the type having a flat central portion and a tangent curled portion at one end serving as a barrel for connection by a pin with an adjoining link, which method comprises: cold coining an impression on one side of the link which covers an area extending from the flat portion into the tongue which is to be curled; then curling the tongue portion so it is tangent to the central portion, with the impression on the inside of the curl, the depth of the impression compensating for the tendency of the ends of the curled portion to bell outwardly in forming and producing a more nearly cylindrical barrel; and finally uncurling the curled portion to impose residual compressive stresses on the inside of the curled portion, the cold coining of the impression conditioning the metal whereby the curled portion is maintained tangent to the flat portion during the uncurling step.

7. In the manufacture of chain links of the type having a flat central portion and a tongue portion at one end curled to form a barrel for connection by a pin with an adjoining link, the steps of cold coining prior to curling a generally rectangular impression on one side of the link extending from the flat portion over an area of the tongue, said impression being generally parallel to the tongue and of a length at least as great as the wearing surface of the tongue after it is curled; curling said tongue so it is substantially tangent to the flat portion of the link, with the impression on the inner side of the curl, the dimensions of the impression compensating for the tendency of the ends of the curled portion to bell outwardly in forming and producing a more nearly cylindrical barrel, the pitch of the link after said curling step being less than the ultimate desired; and then uncurling the curled portion to increase the pitch of the link to the correct length and to impose residual compressive stresses on the inside of the curled portion, the cold coining of the impression having conditioned the metal whereby the curled portion is maintained tangent to the flat portion during the uncurling step.

8. In a chain comprising links of the type having a flat central portion and a tangent curled portion at one end and a pin extending through the curled portion for connection of adjacent links, the improvement which resides in the provision of a recess on the inside of the curl extending over the contiguous flat portion of the link, said recess being produced by a cold coined impression, and being characterized by increased hardness whereby the tendency of the curl to assume a non-tangent relation to the flat portion of the link when a load is imposed on the chain is effectively resisted.

9. In a chain comprising links of the type having a flat central portion and a contiguous curled portion at one end providing a transverse, generally cylindrical opening of substantial length for enclosing a pin connecting said link with an adjacent link in the chain strand, the improvement which resides in the provision of a curled portion which has a recess on the side which engages the pin to produce engagement between the pin and curled portion at the ends as well as at the center of the curled portion, said recess being produced by a cold coined impression on the inside of the curled portion prior to curling, the depth of the impression compensating for the flaring of the end portions of the curl during curling, whereby greater area of contact between the pin and the curled portion is obtained.

WILLIAM D. CHEESMAN.

References Cited in the file of this patent

UNITED STATES PATENTS

| Number | Name | Date |
|---|---|---|
| 670,285 | Levalley | Mar. 19, 1901 |
| 1,966,659 | Wynne et al. | July 17, 1934 |